(12) United States Patent
Girault et al.

(10) Patent No.: US 11,285,648 B2
(45) Date of Patent: Mar. 29, 2022

(54) MOULDING SYSTEM WITH ALIGNMENT MONITORING SYSTEM

(71) Applicant: ERMO SAS, Marcille (FR)

(72) Inventors: Pascal Girault, Marcille (FR); Laurent Maunoury, Marcille (FR); Maurizio Del Nevo, Marcille (FR)

(73) Assignee: ERMO SAS, Marcille (FR)

( * ) Notice: Subject to any disclaimer, the term of this patent is extended or adjusted under 35 U.S.C. 154(b) by 309 days.

(21) Appl. No.: 16/527,208

(22) Filed: Jul. 31, 2019

(65) Prior Publication Data
US 2020/0039135 A1 Feb. 6, 2020

(30) Foreign Application Priority Data
Aug. 1, 2018 (FR) ...................................... 1870890

(51) Int. Cl.
*B29C 45/80* (2006.01)
*B29C 33/30* (2006.01)
*B29C 45/03* (2006.01)

(52) U.S. Cl.
CPC .............. *B29C 45/80* (2013.01); *B29C 33/30* (2013.01); *B29C 45/03* (2013.01); *B29C 2945/76083* (2013.01); *B29C 2945/76254* (2013.01)

(58) Field of Classification Search
CPC .................. B29C 45/80; B29C 33/307; B29C 2945/76224
See application file for complete search history.

(56) References Cited

U.S. PATENT DOCUMENTS 6,171,092 B1 * 1/2001 Galt ........................ B29C 45/80
100/258 A
2014/0197561 A1 7/2014 Pirog

FOREIGN PATENT DOCUMENTS

DE 102009049733 A1 4/2011
JP 2015139965 A 8/2015

OTHER PUBLICATIONS

Rieken, DE 10 2009 049 733 A1, Apr. 21, 2011, Machine Translation (Year: 2011).*

* cited by examiner

*Primary Examiner* — Galen H Hauth
(74) *Attorney, Agent, or Firm* — Leason Ellis LLP

(57) ABSTRACT

The invention relates to a moulding system (100) comprising a structure (102), a fixed mould (104) fixed to the structure (102), a first mobile mould (106) mounted with translational mobility on the structure (102) between an open position in which the first mobile mould (106) is away from the fixed mould (104) and a closed position in which the first mobile (106) is against the fixed mould (104), and a monitoring system (150) which comprises:
  a first reference surface (152) solidly fixed to the fixed mould (104) and parallel to the direction of translational movement (50) of the first mobile mould (106),
  a first sensor (154) solidly fixed to the first mobile mould (106) which comes to bear against the first reference surface (152) and is configured to measure a first distance perpendicular to the first reference surface (152), and
  a control unit (156) which is connected to the first sensor (154) and which is configured to detect a deviation in the first distance measured by the first sensor (154) with respect to a first tolerance band.

8 Claims, 3 Drawing Sheets

MOULDING SYSTEM WITH ALIGNMENT MONITORING SYSTEM

CROSS-REFERENCE TO RELATED PATENT APPLICATION

This application claims the benefit of priority to French Patent Application number 1870890 filed Aug. 1, 2018, which is incorporated by reference in its entirety.

TECHNICAL FIELD

The present invention relates to a moulding system with a system for monitoring the alignment between the various parts that make up the moulding system.

PRIOR ART

An industrial moulding system conventionally comprises a structure which is fixed and on which a fixed mould and mobile mould are mounted. The mobile mould comes into contact against the fixed mould so as to allow a substance that is to be moulded to be injected into cavities delimited by the fixed mould and the mobile mould. After injection and solidification, the mobile mould moves away from the fixed mould to release the moulded components.

The frequent movements of the mobile mould may upset the alignment between the fixed mould and the mobile mould, and this misalignment may then cause the moulding of components that are defective and/or lead to mess on the mould.

The documents JP-A-2015 139965, US-A-2014/197561 and DE-A-10 2009 049733 disclose moulding systems of the state of the art.

SUMMARY OF THE INVENTION

It is an object of the present invention to propose a moulding system which comprises a monitoring system that makes it possible to detect a misalignment between the fixed and mobile moulds of the moulding system.

To this end, there is proposed a moulding system comprising a structure, a fixed mould fixed to the structure, a first mobile mould mounted with translational mobility on the structure between an open position in which the first mobile mould is away from the fixed mould and a closed position in which the first mobile mould is against the fixed mould, and a monitoring system which comprises:

a first reference surface solidly fixed to the fixed mould and parallel to the direction of translational movement of the first mobile mould,
  a first sensor solidly fixed to the first mobile mould which comes to bear against the first reference surface and is configured to measure a first distance perpendicular to the first reference surface, and
  a control unit which is connected to the first sensor and which is configured to detect a deviation of the first distance measured by the first sensor with respect to a first tolerance band,
wherein the monitoring system comprises a first proximity system connected to the control unit and intended to detect a measurement position which is an intermediate position of the first mobile mould between the open position and the closed position, the control unit is configured to detect when the first proximity system detects the measurement position, and the control unit is configured to detect the deviation in the first distance between the measurement position and the closed position.

Advantageously, the first proximity system comprises a first mark solidly fixed to the fixed mould and a first additional sensor solidly fixed to the first mobile mould and connected to the control unit, and the first mark and the first additional sensor are arranged in such a way that the first additional sensor senses the presence of the first mark when the first mobile mould reaches the measurement position.

Advantageously, the moulding system comprises another monitoring system, wherein the monitoring systems are disposed on the port and starboard sides in relation to the direction of the translation and the control unit is configured to determine a deviation value of each distance measured by one of the two monitoring systems from the same distance previously measured and the control unit is configured to determine whether the sign of the deviation value is different for the two measured distances.

Advantageously, the moulding system comprises a second mobile mould mounted with translational mobility on the structure between an open position in which the second mobile mould is away from the first mobile mould and a closed position in which the second mobile mould is against the first mobile mould, the monitoring system also comprises a second reference surface solidly fixed to the second mobile mould and parallel to the direction of translational movement of the second mobile mould, and a second sensor solidly fixed to the first mobile mould which comes to bear against the second reference surface and is configured to measure a second distance perpendicular to the second reference surface, and the control unit is connected to the second sensor and is configured to detect a deviation in the second distance measured by the second sensor with respect to a second tolerance band.

Advantageously, the moulding system comprises another monitoring system with another first reference surface solidly fixed to the fixed mould and parallel to the direction of translation of the first mobile mould, another second reference surface solidly fixed to the second mobile mould and parallel to the direction of translation of the second mobile mould, another first sensor solidly fixed to the first mobile mould and another second sensor solidly fixed to the first mobile mould, the first reference surface and the said other first reference surface are located on the port and starboard sides in relation to the direction of translation, the second reference surface and the said other second reference surface are disposed on the port and starboard sides in relation to the direction of translation, the control unit is configured to determine a deviation value of each distance measured by a first, respectively second, sensor of the two monitoring systems relative to the same distance previously measured and the control unit is configured to determine if the sign of the deviation value is different for the two distances measured by both first, respectively second, sensors.

Advantageously, the monitoring system comprises a second proximity system connected to the control unit and intended to detect a measurement position which is an intermediate position of the second mobile mould between the open position and the closed position, the control unit is configured to detect when the second proximity system detects the measurement position, and the control unit is configured to detect the deviation in the second distance between the measurement position and the closed position.

Advantageously, the second proximity system comprises a second mark solidly fixed to the second mobile mould and a second additional sensor solidly fixed to the first mobile mould and connected to the control unit, and the second mark and the second additional sensor are positioned in such a way that the second additional sensor senses the presence of the second mark when the second mobile mould reaches the measurement position.

Advantageously, for each reference surface, the monitoring system comprises a supplementary reference surface solidly fixed to the mould which is solidly fixed to the said reference surface and which is parallel to the direction of translational movement and perpendicular to the said reference surface, and a supplementary sensor solidly fixed to the first mobile mould and which comes to bear against the supplementary reference surface and is configured to measure a supplementary distance perpendicular to the supplementary reference surface, and in that the control unit is connected to the supplementary sensor and is configured to detect a deviation in the supplementary distance measured by the supplementary sensor with respect to a third tolerance band.

BRIEF DESCRIPTION OF THE DRAWINGS

The abovementioned features of the invention, together with others, will become more clearly apparent from reading the following description of one exemplary embodiment, said description being given in connection with the attached drawings, among which.

DETAILED DESCRIPTION OF EMBODIMENTS

Figure 1:
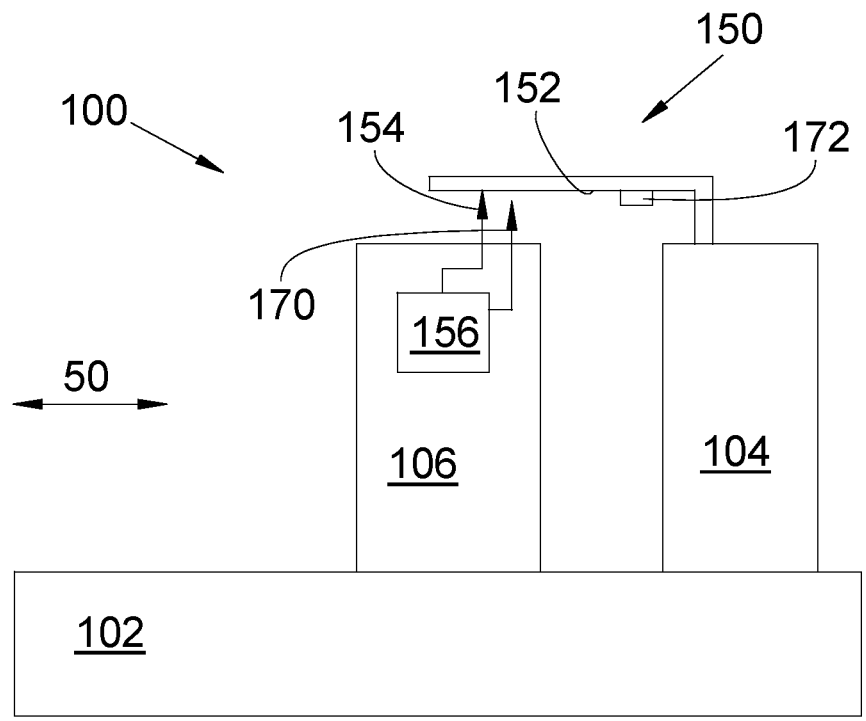
FIG. 1 is a schematic depiction of a moulding system according to a first embodiment of the invention, in an open position.
Figure 2:
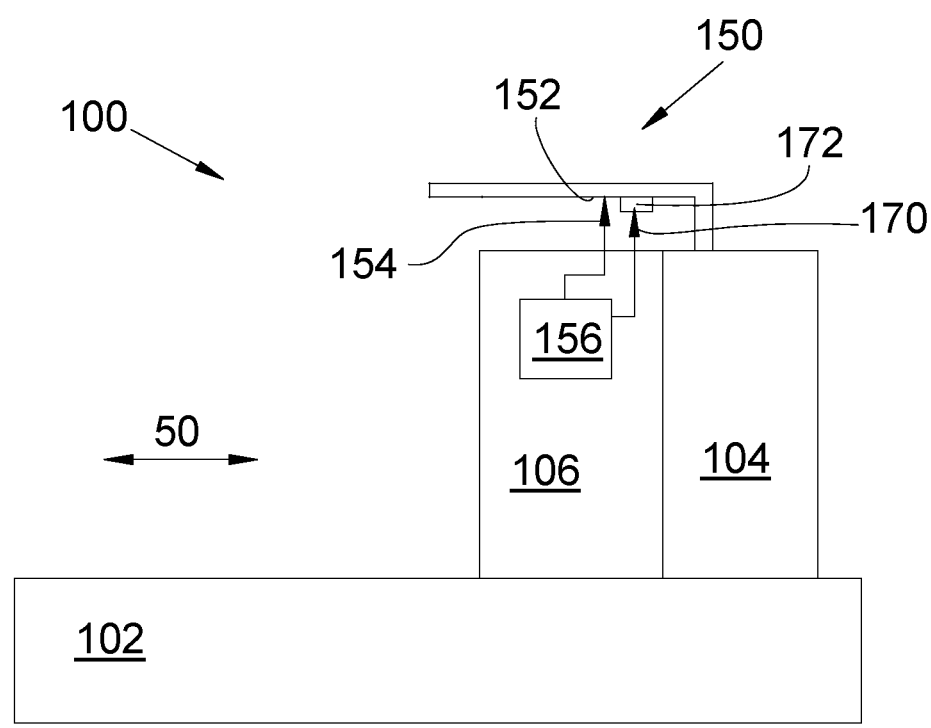
FIG. 2 is a schematic depiction of the moulding system according to the first embodiment of the invention, in a closed position.

FIG. 1 and FIG. 2 show a moulding system 100 according to a first embodiment of the invention which comprises a structure 102, a fixed mould 104 fixed to the structure 102 and a first mobile mould 106 mounted with translational mobility on the structure 102.

The first mobile mould 106 is able to move between an open position (FIG. 1) in which the first mobile mould 106 is sway from the fixed mould 104, in particular so that the moulded components can be removed, and a closed position (FIG. 2) in which the first mobile mould 106 is against the fixed mould 104, particularly for moulding the components.

The moving of the first mobile mould 106 is performed by any known movement systems.

The moulding system 100 comprises a monitoring system 150 which comprises:
- a first reference surface 152 solidly fixed to the fixed mould 104 and parallel to the direction of translational movement 50 of the first mobile mould 106,
- a first sensor 154 solidly fixed to the first mobile mould 106 and which comes to bear against the first reference surface 152 and is configured to measure a first distance perpendicular to the first reference surface 152, and
- a control unit 156 which is connected to the first sensor 154 and which is configured to detect a deviation in the first distance measured by the first sensor 154 with respect to a first tolerance band.

The first sensor 154 is, for example, of the feeler type and when the monitoring system 150 is set up the reference of the first sensor 154 is fixed, by setting to zero for example.

As the first mobile mould 106 moves, the first sensor 154 bears against the first reference surface 152 and measures the first distance between its reference and the first reference surface 152.

The first distance thus measured is transmitted to the control unit 156 which compares it against the first tolerance band and if the first distance is outside of this first tolerance band, the control unit 156 triggers a visible and/or audible alarm, but also the possibility of stopping the injection moulding machine and/or of sending a message to a monitoring centre which will allow a technician to adjust the moulding system 100.

The control unit 156 in the conventional way comprises, connected by a communication bus: a processor or CPU (Central Processing Unit), a RAM (Random Access Memory); a ROM (Read Only Memory); a storage unit such as a hard disk or a storage support reader such as an SD (Secure Digital) card reader; and at least one communication interface 05 allowing, for example, the control unit 156 to communicate with the first sensor and a message generator.

The processor is capable of executing instructions loaded into the RAM from the ROM, from an external memory (not depicted), from a storage medium (such as an SD card), or from a communications network. When the equipment is powered up, the processor is capable of reading instructions from the RAM and executing them. These instructions form a computer program causing the processor to implement all or some of the algorithms and steps described in the description.

All or some of the algorithms and steps described hereinafter may be implemented in software form by having a programmable machine, for example a DSP (Digital Signal Processor) or a microcontroller execute a set of instructions, or may be implemented in hardware form by a dedicated machine or component, for example an FPGA Programmable Gate Array) or an ASIC (Application-Specific Integrated Circuit).

Figure 3:
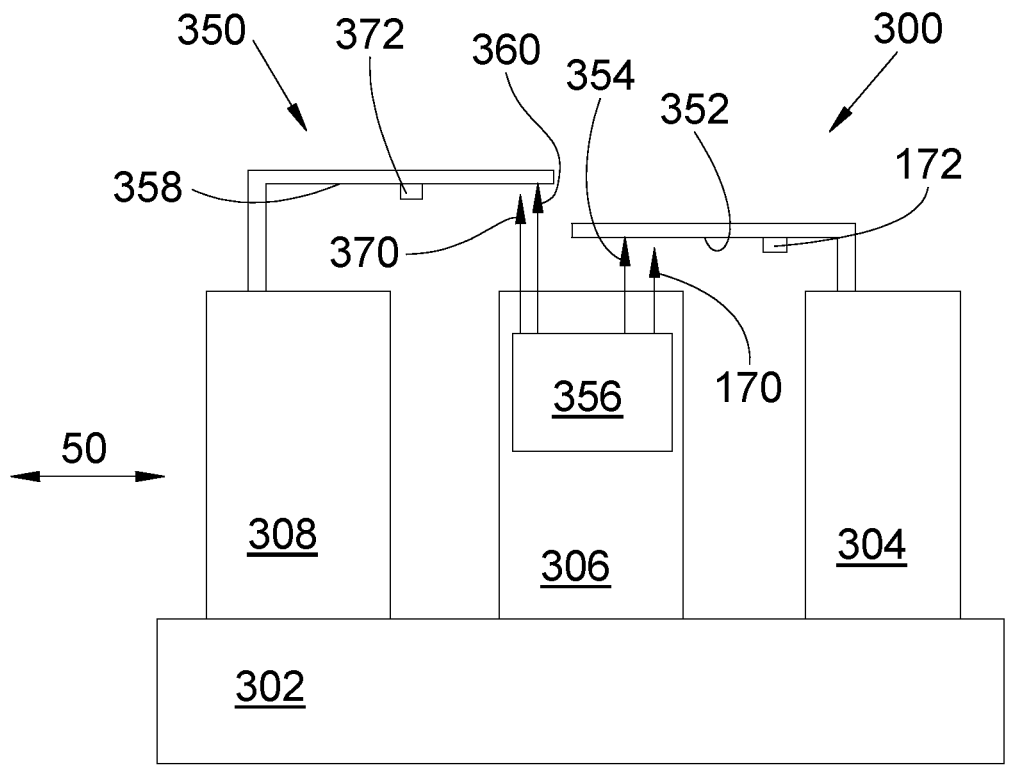
FIG. 3 is a schematic depiction of a moulding system according to a second embodiment of the invention, in an open position.
Figure 4:
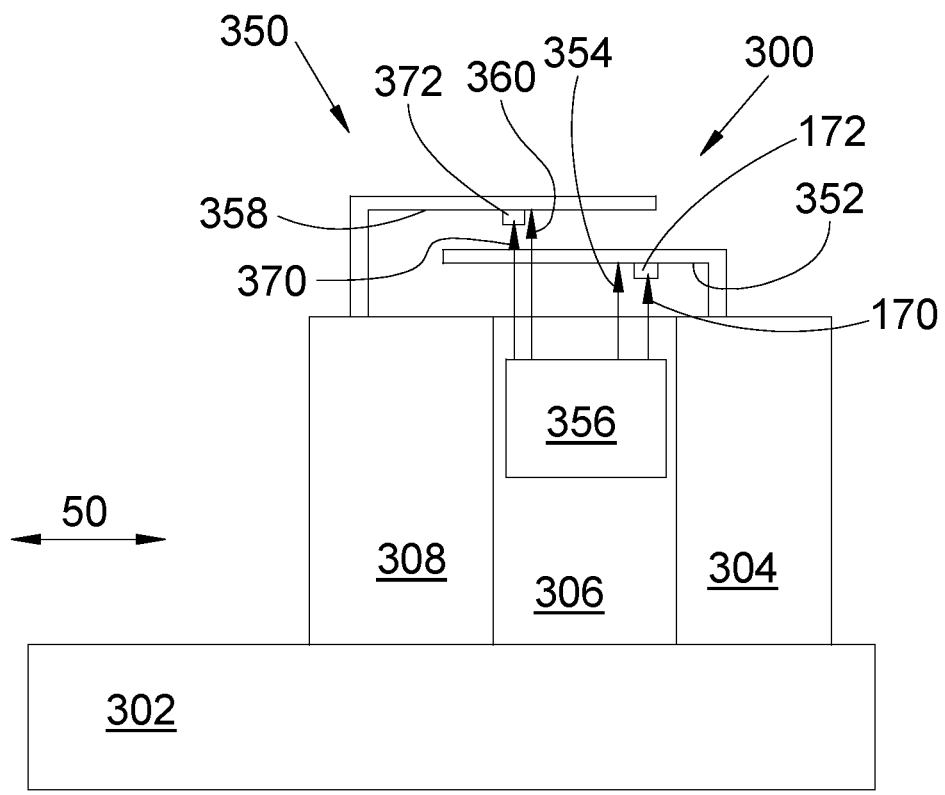
FIG. 4 is a schematic depiction of the moulding system according to the second embodiment of the invention, in a closed position.

FIG. 3 and FIG. 4 show a moulding system 300 according to a second embodiment of the invention which comprises a structure 302, a fixed mould 304 fixed to the structure 302, and a first mobile mould 306 and a second mobile mould 308 mounted with translational mobility on the structure 302. Such a moulding system is said to be a two-stage system and allows components to be moulded on each side of the first mobile mould 306.

The first mobile mould 306 is able to move between an open position (FIG. 3) in which the first mobile mould 306 is away from the fixed mould 304 and a closed position (FIG. 4) in which the first mobile mould 306 is against the fixed mould 304.

Likewise, the second mobile mould 308 is able to move between an open position (FIG. 3) in which the second mobile mould 308 is away from the first mobile mould 306 and a closed position (FIG. 4) in which the second mobile mould 308 is against the first mobile mould 306.

The movements of the first mobile mould 306 and of the second mobile mould 308 are brought about by any known movement systems.

Like in the first embodiment of the invention, the moulding system 300 comprises a monitoring system 350 which comprises:
- a first reference surface 352 solidly fixed to the fixed mould 304 and parallel to the direction of translational movement 50 of the mobile moulds 306 and 308,
- a first sensor 354 solidly fixed to the first mobile mould 306 which comes to bear against the first reference surface 352 and is configured to measure a first distance perpendicular to the first reference surface 352, and
- a control unit 356 which is connected to the first sensor 354 and which is configured to detect a deviation in the first distance measured by the first sensor 354 with respect to a first tolerance band.

The monitoring system 350 also comprises:
- a second reference surface 358 solidly fixed to the second mobile mould 308 and parallel to the direction of translational movement 50 of the mobile moulds 306 and 308, and
- a second sensor 360 solidly fixed to the first mobile mould 306 which comes to bear against the second reference surface 358 and is configured to measure a second distance perpendicular to the second reference surface 358.

The control unit 356 is connected to the second sensor 358 and is configured to detect a deviation in the second distance measured by the second sensor 358 with respect to a second tolerance band.

As before, each sensor 354, 360 is, for example, of the feeler type and when the monitoring system 350 is set up the reference of the sensor 354, 360 is fixed, for example by setting to zero.

As the mobile moulds 306 and 308 move, the associated sensor 354, 360 bears against the corresponding reference surface 352, 358 and measures the distance between its reference and the reference surface 352, 358.

Each distance thus measured is transmitted to the control unit 356 which compares it with the corresponding tolerance band and if the distance is outside of this tolerance band the control unit 356 triggers an alarm, such as, for example, the sending of a message to a monitoring centre which will allow a technician to adjust the moulding system 300.

Insofar as the movement of a mobile mould 106, 306, 308 is relatively long, there is no need to scrutinize the deviation in the distance over the entire range of movement but only onwards of a specific position of the mobile mould 106, 306, 308, referred to as the measurement position. Thus, the monitoring of the deviation is performed onwards from the moment at which the mobile mould 106, 306, 308 reaches the measurement position which is an intermediate position between the open position and the closed position. The measurement position is generally a position close to the closed position or to a position of critical alignment.

In the first embodiment, the monitoring system 150, 350 comprises a first proximity system connected to the control unit 156, 356 and intended to detect the measurement position of the first mobile mould 106, 306 and the deviation in the first distance is thus monitored between the measurement position and the closed position. The control unit 156, 356 is therefore configured to detect when the first proximity system detects the measurement position, and to detect the deviation in the first distance between the measurement position and the closed position of the first mobile mould 106, 306.

In the first embodiment, the first proximity system comprises a first additional sensor 170 solidly fixed to the first mobile mould 106 and connected to the control unit 156 which detects when the first mobile mould 106 reaches the measurement position on the basis of the information delivered by the first additional sensor 170. When the control unit 156 detects that the measurement position has been reached, it then takes account of the first distance measured by the first sensor 154 in order to compare it against the first band.

In the first embodiment of the invention, the first proximity system comprises a first mark 172 solidly fixed to the fixed mould 104 and the first additional sensor 170. The first mark 172 and the first additional sensor 170 are positioned in such a way that the first additional sensor 170 senses the position of the first mark 172 when the first mobile mould 106 reaches the measurement position.

The measurement position may be set according to the features of the moulding system 100. According to one preferred embodiment, the measurement position is, for example, approximately 15 mm away from the closed position.

In the second embodiment, the monitoring system 350 comprises a second proximity system connected to the control unit 356 and designed to detect the measurement position of the second mould 308 and the deviation in the second distance is thus monitored between the measurement position and the closed position. The control unit 356 is then configured to detect when the second proximity system detects the measurement position and to detect the deviation in the second distance between the measurement position and the closed position of the second mobile mould 308.

In the second embodiment, the second proximity system comprises a second additional sensor 370 solidly fixed to the first mobile mould 306 and connected to the control unit 356 which detects when the second mobile mould 308 reaches the measurement position on the basis of the information delivered by the second additional sensor 370. When the control unit 356 detects that the measurement position has been reached, it then takes account of the second distance measured by the second sensor 354 to compare it against the second band.

In the second embodiment of the invention, the second proximity system thus also comprises a second mark 372 solidly fixed to the second mobile mould 308 and the second additional sensor 370. The second mark 372 and the second additional sensor 370 are positioned in such a way that the second additional sensor 370 senses the presence of the second mark 372 when the second mobile mould 308 reaches the measurement position.

As before, the measurement position may be set on the basis of the characteristics of the moulding system 300. According to one particular embodiment, the measurement position is, for example, around 15 mm away from the closed position.

Figure 5:
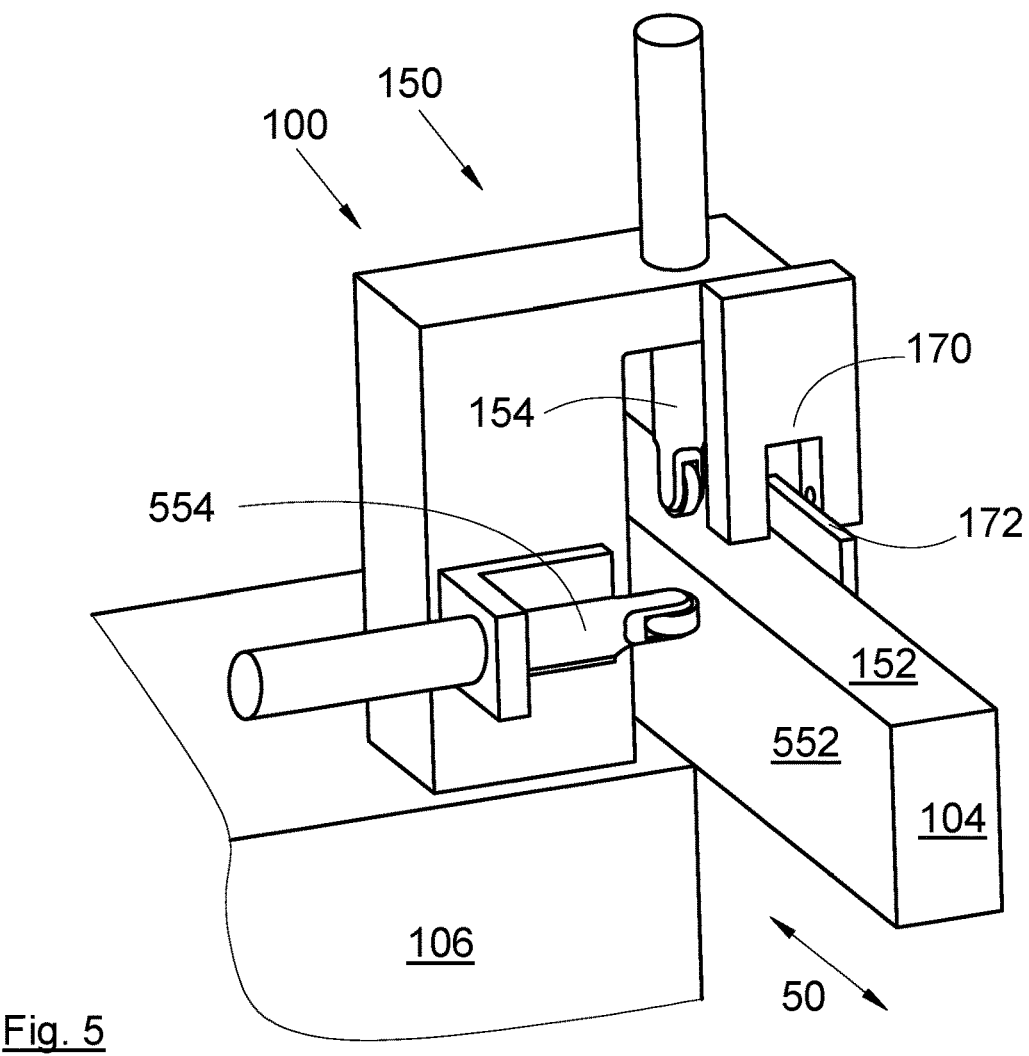
FIG. 5 is a depiction of a detail of the monitoring system of the moulding system according to the invention.

FIG. 5 shows an alternative form which is more particularly described in the case of the first embodiment, but applies in the same way to the second embodiment. In this alternative form, a deviation is measured in two orthogonal directions, namely with respect to the first reference surface 152 and with respect to a first supplementary reference surface 552 solidly fixed to the fixed mould 104 and which is parallel to the direction of translational movement 50 and perpendicular to the first reference surface 152.

The monitoring system 150 then comprises the first supplementary reference surface 552 and a first supplementary sensor 554 solidly fixed to the first mobile mould 106 which comes to bear against the first supplementary reference surface 552 and is configured to measure a first supplementary distance perpendicular to the first supplementary reference surface 552.

The control unit 156 is connected to the first supplementary sensor 554 and is configured to detect a deviation in the first supplementary distance measured by the first supplementary sensor 554 with respect to a third tolerance band.

The first supplementary sensor 554 is, for example, of the feeler type, and when the monitoring system 150 is set up the reference of the first supplementary sensor 554 is fixed, for example by setting to zero.

As the first mobile mould 106 moves, the first supplementary sensor 554 bears against the first supplementary reference surface 552 and measures the first supplementary distance between its reference and the first supplementary reference surface 552.

Each distance thus measured is transmitted to the control unit 156 which compares it against the corresponding tolerance band and, if the distance is outside this tolerance band, the control unit 156 triggers a visible and/or audible alarm, but has the possibility of stopping the injection moulding machine and/or of sending a message to a monitoring system to allow a technician to reset the moulding system 100.

In the case of the second embodiment, such an additional surface and such a supplementary sensor may be fitted on the second mobile mould 308.

Thus, in general, for each reference surface 152, 352, 358, the monitoring system 150, 350 comprises a supplementary reference surface 552 solidly fixed to the mould 104, 304, 308 which is solidly fixed to the said reference surface 152, 352, 358 and which is parallel to the direction of translational movement 50 and perpendicular to the said reference surface 152, 352, 358, and a supplementary sensor 554 solidly fixed to the first mobile mould 106, 306 and which comes to bear against the supplementary reference surface 552 and is configured to measure a supplementary distance perpendicular to the supplementary reference surface 552, and the control unit 156, 356 is connected to the supplementary sensor 554 and is configured to detect a deviation in the supplementary distance measured by the supplementary sensor 554 with respect to a third tolerance band.

Of course, consideration of the measurements from the supplementary sensor 554 is subject to detection of the mark 172, 372 by the additional sensor 170, 370.

In the embodiment of the invention depicted in FIG. 5, the first additional sensor 170 takes the form of a fork sensor and the first mark 172 takes the form of a wall which is intended to pass through the fork of the said first additional sensor 170.

The various data emanating from sensors may be logged in files that a technician can consult in the context of the maintenance of the moulding system.

Figure 6:
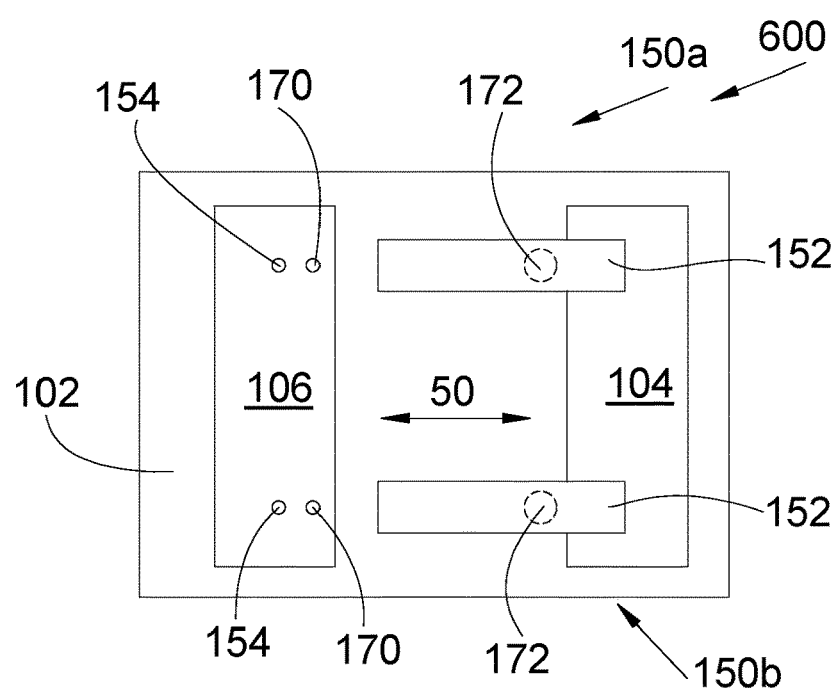
FIG. 6 is a top view of a moulding system according to a particular embodiment of the invention.

FIG. 6 shows a moulding system 600 corresponding to a particular embodiment of the first embodiment (FIGS. 1 and 2), but this variant applies in the same way to the second embodiment (FIGS. 3 and 4). This arrangement also allows a detection of a defect in the angular orientation of the mobile mould 106 compared to the fixed mould 104.

The moulding system 600 comprises two monitoring systems 150a-b that are disposed on the port and starboard sides in relation to the direction of translation 50, that is in the depth of moulds 104 and 106.

As described above, each monitoring system 150a-b has a first reference surface 152 solidly fixed to the fixed mould 104 and a first sensor 154 solidly fixed to the first mobile mould 106 and configured to measure a first distance perpendicular to the first reference surface 152.

The control unit 156 may be common to both monitoring systems 150a-b or each control unit 156 may be linked to a higher control unit which receives information from each control unit 156.

For each distance measured by one of the two monitoring systems 150a-b, the associated control unit 156 or the higher control unit determines a deviation value of said distance measured from the same distance previously measured and stored for example in memory during the previous measurement.

Thus, for the first sensor 154 of the first monitoring system 150a, the associated control unit 156 or the higher control unit determines a deviation value of said distance measured by said first sensor from the same distance previously measured and in the same manner for the first sensor 154 of the second monitoring system 150b, the associated control unit 156 or the higher control unit determines a deviation value of the said distance measured by said first sensor from the same distance previously measured.

The associated control unit 156 or the higher control unit can then determine whether the sign (positive or negative) of the deviation value is the same or is different for the two measured distances. A different sign is significant from a rotation of the mobile mould 106 compared to the fixed mould 104.

In this case, the control unit 156 or the higher control unit triggers a visual and/or audible alarm, but also the possibility of stopping the injection moulding machine and/or sending a message to a monitoring centre which will allow a technician to adjust the moulding system 100.

The same variant can be applied to the embodiment of FIGS. 3 and 4.

The moulding system 300 then comprises another monitoring system with another first reference surface solidly fixed to the fixed mould 304 and parallel to the direction of translation 50 of the first mobile mould 306, and another second reference surface solidly fixed to the second mobile mould 308 and parallel to the direction of translation 50 of the second mobile mould 308.

The first reference surface 352 and the said other first reference surface are located on the port and starboard sides in relation to the direction of translation 50, and the second reference surface 358 and the said other second reference surface are located on the port and starboard sides in relation to the direction of translation 50.

For each other reference surface, said other monitoring system comprises another first sensor solidly fixed to the first mobile mould 306 and another second sensor solidly fixed to the first mobile mould 306, where each is configured to measure a distance perpendicular to the associated reference surface.

As before, for each distance measured by a first or second sensor of the two monitoring systems, the associated control unit 356 or the higher control unit determines a deviation value of said distance measured from the same distance previously measured.

This means that the control unit 356 is configured to determine a deviation value of each distance measured by a first, respectively second, sensor of the two monitoring systems relative to the same previously measured distance and that the control unit 356 is configured to determine if the sign of the deviation value is different for the two distances measured by the first two, respectively second, sensors.

Thus, for the first sensor 354 of the first monitoring system 350, the associated control unit 356 or the higher control unit determines a deviation value of said distance measured by said first sensor from the same distance previously measured and in the same manner for the first sensor the second monitoring system, the associated control unit 356 or the higher control unit determines a deviation value of the said distance measured by the said first sensor from the same distance previously measured. And for the second sensor 360 of the first monitoring system 350, the associated control unit 356 or the higher control unit determines a deviation value of the said distance measured by the said second sensor from the same distance previously measured and in the same manner for the second sensor of the second monitoring system, the associated control unit 356 or higher control unit determines a deviation value of the said distance measured by the said second sensor from the same distance previously measured. The associated control unit 356 or the higher control unit can then determine whether the sign (positive or negative) of the deviation value is the same or is different for the two distances measured by the first, respectively second, sensors. A different sign for the first sensors is significant from a rotation of the first mobile mould 306 compared to the fixed mould 304 and a different sign for the second sensors is a rotation of the second mobile mould 308 compared to the first mobile mould 306.

In the case of at least one negative sign, the control unit 356 or the higher control unit triggers a visual and/or audible alarm, but also the possibility of stopping the injection moulding machine and/or sending a message to a monitoring centre which will allow a technician to adjust the moulding system.

The invention claimed is:

1. A moulding system (100, 300) comprising a structure (102, 302), a fixed mould (104, 304) fixed to the structure (102, 302), a first mobile mould (106, 306) mounted with translational mobility on the structure (102, 302) between an open position in which the first mobile mould (106, 306) is away from the fixed mould (104, 304) and a closed position in which the first mobile mould (106, 306) is against the fixed mould (104, 304), and a monitoring system (150, 350) which comprises:
    a first reference surface (152, 352) solidly fixed to the fixed mould (104, 304) and parallel to the direction of translational movement (50) of the first mobile mould (106, 306),
    a first sensor (154, 354) solidly fixed to the first mobile mould (106, 306) which comes to bear against the first reference surface (152, 352) and is configured to measure a first distance perpendicular to the first reference surface (152, 352), and
    a control unit (156, 356) which is connected to the first sensor (154) and which is configured to detect a deviation in the first distance measured by the first sensor (154) with respect to a first tolerance band,
    a first proximity system connected to the control unit (156, 356) and intended to detect a measurement position which is an intermediate position of the first mobile mould (106, 306) between the open position and the closed position,
    wherein the control unit (156, 356) is configured to detect when the first proximity system detects the measurement position,
    wherein the control unit (156, 356) is configured to detect the deviation in the first distance between the measurement position and the closed position,
    wherein the first proximity system comprises a first mark (172) solidly fixed to the fixed mould (104) and a first additional sensor (170) solidly fixed to the first mobile mould (106) and connected to the control unit (156), and wherein the first mark (172) and the first additional sensor (170) are arranged in such a way that the first additional sensor (170) senses the presence of the first mark (172) when the first mobile mould (106) reaches the measurement position.

2. The moulding system (100) according to claim 1, wherein the moulding system (100) comprises another monitoring system (150*a-b*), which comprises:
    a second reference surface (152, 352) solidly fixed to the fixed mould (104, 304) and parallel to the direction of translational movement (50) of the first mobile mould (106, 306),
    a second sensor (154, 354) solidly fixed to the first mobile mould (106, 306) which comes to bear against the second reference surface (152, 352) and is configured to measure a second distance perpendicular to the dual reference surfaces (152, 352), and
    a control unit (156, 356) which is connected to the first and second sensors (154) and which is configured to detect a deviation in the distances measured by the first and second sensors (154) with respect to a first tolerance band,
    a first proximity system connected to the control unit (156, 356) and intended to detect a measurement position (156, 356) which is an intermediate position of the first mobile mould (106, 306) between the open position and the closed position,
    wherein the control unit (156, 356) is configured to detect when the first proximity system detects the measurement position,
    wherein the control unit (156, 356) is configured to detect the deviation in the first distance between the measurement position and the closed position,
    wherein the monitoring system and the second monitoring system are disposed on the port and starboard sides in relation to the direction of the translation (50) and the control unit (156) is configured to determine a deviation value of each distance measured by the associated one of the two monitoring systems (150*a-b*) from the distances previously measured and the control unit (156) is configured to determine whether a sign of the deviation value is different for the two measured distances.

3. A moulding system (100, 300) comprising a structure (102, 302), a fixed mould (104, 304) fixed to the structure (102, 302), a first mobile mould (106, 306) mounted with translational mobility on the structure (102, 302) between an open position in which the first mobile mould (106, 306) is away from the fixed mould (104, 304) and a closed position in which the first mobile mould (106, 306) is against the fixed mould (104, 304), and a monitoring system (150, 350) which comprises:
    a first reference surface (152, 352) solidly fixed to the fixed mould (104, 304) and parallel to the direction of translational movement (50) of the first mobile mould (106, 306),
    a first sensor (154, 354) solidly fixed to the first mobile mould (106, 306) which comes to bear against the first reference surface (152, 352) and is configured to measure a first distance perpendicular to the first reference surface (152, 352), and
    a control unit (156, 356) which is connected to the first sensor (154) and which is configured to detect a deviation in the first distance measured by the first sensor (154) with respect to a first tolerance band,
    a first proximity system connected to the control unit (156, 356) and intended to detect a measurement position which is an intermediate position of the first mobile mould (106, 306) between the open position and the closed position, wherein the control unit (156, 356) is configured to detect when the first proximity system detects the measurement position, wherein the control unit (156, 356) is configured to detect the deviation in the first distance between the measurement position and the closed position, wherein the moulding system comprises a second mobile mould (308) mounted with translational mobility on the structure (302) between an open position in which the second mobile mould (308) is away from the first mobile mould (306) and a closed position in which the second mobile mould (308) is against the first mobile mould (306), wherein the monitoring system (350) also comprises a second reference surface (358) solidly fixed to the second mobile mould (308) and parallel to the direction of translational movement (50) of the second mobile mould (308), and a second sensor (360) solidly fixed to the first mobile mould (306) which comes to bear against the second reference surface (358) and is configured to measure a second distance perpendicular to the second reference surface (358), and wherein the control unit (356) is connected to the second sensor (358) and is configured to detect a deviation in the second distance measured by the second sensor (358) with respect to a second tolerance band.

4. The moulding system (300) according to claim 3, wherein the moulding system (300) comprises another monitoring system with another first reference surface solidly fixed to the fixed mould (304) and parallel to the direction of translation (50) of the first mobile mould (306), another second reference surface solidly fixed to the second mobile mould (308) and parallel to the direction of translation (50) of the second mobile mould (308), another first sensor solidly fixed to the first mobile mould (306) and another second sensor solidly fixed to the first mobile mould (306), wherein the first reference surface (352) and the said other first reference surface are located on the port and starboard sides in relation to the direction of translation (50), wherein the second reference surface (258) and the said other second reference surface are disposed on the port and starboard sides in relation to the direction of translation (50), wherein the control unit (356) is configured to determine a deviation value of each distance measured by a first, respectively second, sensor of the two monitoring systems relative to the same distance previously measured and wherein the control unit (356) is configured to determine if the sign of the deviation value is different for the four distances measured by both first sensors and if the sign of the deviation value is different for the four distances measured by both sensors of the respective monitoring systems.

5. The moulding system (300) according to claim 3, wherein the monitoring system (350) comprises a second proximity system connected to the control unit (356) and intended to detect a measurement position which is an intermediate position of the second mobile mould (308) between the open position and the closed position, wherein the control unit (356) is configured to detect when the second proximity system detects the measurement position, and wherein the control unit (356) is configured to detect the deviation in the second distance between the measurement position and the closed position.

6. The moulding system (300) according to claim 5, wherein the second proximity system comprises a second mark (372) solidly fixed to the second mobile mould (308) and a second additional sensor (370) solidly fixed to the first mobile mould (306) and connected to the control unit (356), and wherein the second mark (372) and the second additional sensor (370) are positioned in such a way that the second additional sensor (370) senses the presence of the second mark (372) when the second mobile mould (308) reaches the measurement position.

7. The moulding system (100, 300) according to claim 4, wherein, for each reference surface (152, 352, 358), the monitoring system (150, 350) comprises a supplementary reference surface (552) solidly fixed to the fixed mould (104, 304, 308) which is solidly fixed to the said each reference surface (152, 352, 358) and which is parallel to the direction of translational movement (50) and perpendicular to the said reference surface (152, 352, 358), and a supplementary sensor (554) solidly fixed to the first mobile mould (106, 306) and which comes to bear against the supplementary reference surface (552) and is configured to measure a supplementary distance perpendicular to the supplementary reference surface (552), and wherein the control unit (156, 356) is connected to the supplementary sensor (554) and is configured to detect a deviation in the supplementary distance measured by the supplementary sensor (554) with respect to a third tolerance band.

8. The moulding system (100, 300) according to claim 3, wherein, for each reference surface (152, 352, 358), the monitoring system (150, 350) comprises a supplementary reference surface (552) solidly fixed to the mould (104, 304, 308) which is solidly fixed to the said reference surface (152, 352, 358) and which is parallel to the direction of translational movement (50) and perpendicular to the said reference surface (152, 352, 358), and a supplementary sensor (554) solidly fixed to the first mobile mould (106, 306) and which comes to bear against the supplementary reference surface (552) and is configured to measure a supplementary distance perpendicular to the supplementary reference surface (552), and wherein the control unit (156, 356) is connected to the supplementary sensor (554) and is configured to detect a deviation in the supplementary distance measured by the supplementary sensor (554) with respect to another tolerance band.

* * * * *